United States Patent
Tachibana et al.

(10) Patent No.: US 8,204,651 B2
(45) Date of Patent: Jun. 19, 2012

(54) POWER SOURCE CONTROL DEVICE FOR POWER STEERING

(75) Inventors: Takeshi Tachibana, Chiryu (JP); Koji Ito, Nagoya (JP); Toshinori Esaka, Aichi (JP); Hidenori Matsuto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1271 days.

(21) Appl. No.: 11/883,717

(22) PCT Filed: Nov. 16, 2006

(86) PCT No.: PCT/JP2006/322866
§ 371 (c)(1),
(2), (4) Date: Aug. 3, 2007

(87) PCT Pub. No.: WO2007/066487
PCT Pub. Date: Jun. 14, 2007

(65) Prior Publication Data
US 2008/0177444 A1  Jul. 24, 2008

(30) Foreign Application Priority Data
Dec. 5, 2005  (JP) ................. 2005-350549

(51) Int. Cl.
*B60L 1/10* (2006.01)
(52) U.S. Cl. ............. 701/41; 701/36; 701/45; 701/29.1; 307/9.1; 307/10.1; 307/10.7; 320/104; 320/116; 320/136; 180/65.1; 180/402; 324/426; 324/429; 340/438; 340/455; 340/635; 340/636.1; 340/636.12; 340/636.15; 340/636.16; 340/660

(58) Field of Classification Search ............. 701/29, 701/31, 36, 41, 43, 49; 340/425.5, 428, 438; 180/400, 404, 405, 407, 412, 415
See application file for complete search history.

(56) References Cited

U.S. PATENT DOCUMENTS 4,520,353 A * 5/1985 McAuliffe ............... 340/636.16
4,809,173 A * 2/1989 Fukami et al. ............... 701/43
(Continued)

FOREIGN PATENT DOCUMENTS
CN        1235706        11/1999
(Continued)

OTHER PUBLICATIONS

International Search Report dated Jan. 23, 2007.
(Continued)

*Primary Examiner* — Jonathan M Dager
(74) *Attorney, Agent, or Firm* — Finnegan, Henderson, Farabow, Garrett & Dunner, LLP

(57) ABSTRACT

According to the present invention, a power supply control device for an electric power steering device used for a power supply system comprises a main battery 40 connected to the electric power steering device via a first power supply line and a sub-battery 50 connected to the electric power steering device via a second power supply line, wherein when detecting the state of the sub-battery, said power supply control device restricts or disconnects power supply from the main battery to the electric power steering device while it permits power supply from the sub-battery to the electric power steering device, characterized in that said power supply control device prevents the detection of the state of the second battery if a vehicle speed is higher than a predetermined reference value.

8 Claims, 6 Drawing Sheets

U.S. PATENT DOCUMENTS

| | | | | |
|---|---|---|---|---|
| 4,990,885 A * | 2/1991 | Irick et al. | | 340/455 |
| 5,033,565 A * | 7/1991 | Abukawa et al. | | 180/443 |
| 5,334,926 A * | 8/1994 | Imaizumi | | 320/104 |
| 5,350,994 A * | 9/1994 | Kinoshita et al. | | 320/116 |
| 5,453,930 A * | 9/1995 | Imaseki et al. | | 701/22 |
| 5,798,629 A * | 8/1998 | Terauchi | | 320/106 |
| 6,238,016 B1 * | 5/2001 | Soga | | 303/122.04 |
| 6,329,791 B1 * | 12/2001 | Yokoyama et al. | | 320/127 |
| 6,384,489 B1 * | 5/2002 | Bluemel et al. | | 307/10.1 |
| 6,455,951 B1 * | 9/2002 | Shultz et al. | | 307/10.1 |
| 6,522,960 B2 * | 2/2003 | Nada | | 701/22 |
| 6,580,180 B2 * | 6/2003 | Tamai et al. | | 307/10.1 |
| 6,828,755 B1 * | 12/2004 | Iverson et al. | | 320/104 |
| 7,898,219 B2 * | 3/2011 | Felps | | 320/134 |
| 2001/0002631 A1 * | 6/2001 | Okanoue et al. | | 180/446 |
| 2003/0026116 A1 * | 2/2003 | Ueki et al. | | 363/60 |
| 2003/0233179 A1 * | 12/2003 | Matsubara et al. | | 701/36 |
| 2004/0075345 A1 * | 4/2004 | Yoshioka et al. | | 307/66 |
| 2004/0201362 A1 * | 10/2004 | Borrego Bel et al. | | 320/104 |
| 2005/0072621 A1 * | 4/2005 | Hara et al. | | 180/444 |
| 2005/0253458 A1 * | 11/2005 | Omae et al. | | 307/10.1 |
| 2006/0196714 A1 * | 9/2006 | Sugimoto et al. | | 180/242 |
| 2007/0074926 A1 * | 4/2007 | Takahashi et al. | | 180/417 |
| 2011/0000736 A1 * | 1/2011 | Oya | | 180/443 |

FOREIGN PATENT DOCUMENTS

| | | |
|---|---|---|
| JP | 07-093681 | 4/1995 |
| JP | 8-336201 | 12/1996 |
| JP | 10-091538 | 4/1998 |
| JP | 2000-206215 | 7/2000 |
| JP | 2000-231686 | 8/2000 |
| JP | 2004-017732 | 1/2004 |
| JP | 2004-276833 | 7/2004 |
| JP | 2005-199908 | 7/2005 |

OTHER PUBLICATIONS

Chinese Office Action mailed May 8, 2009.

* cited by examiner

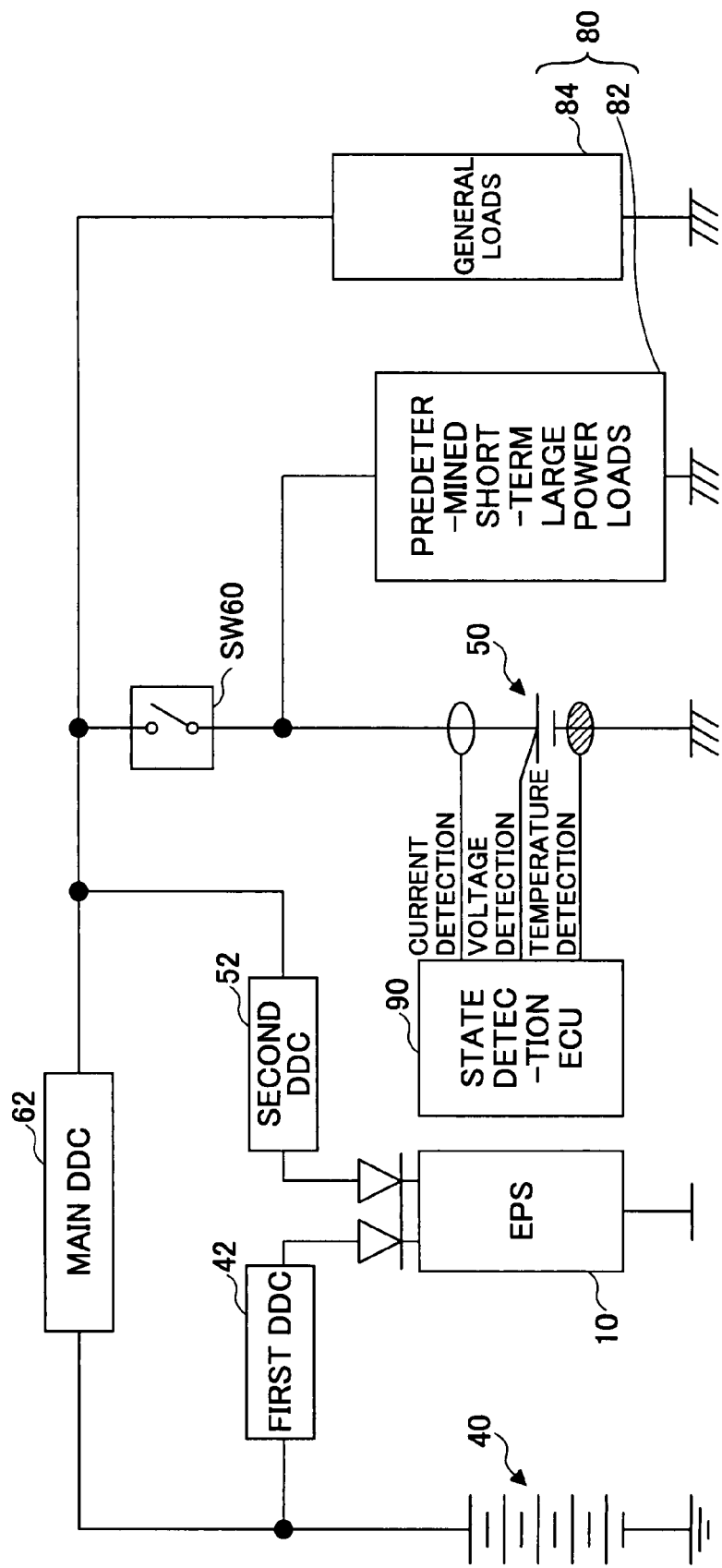

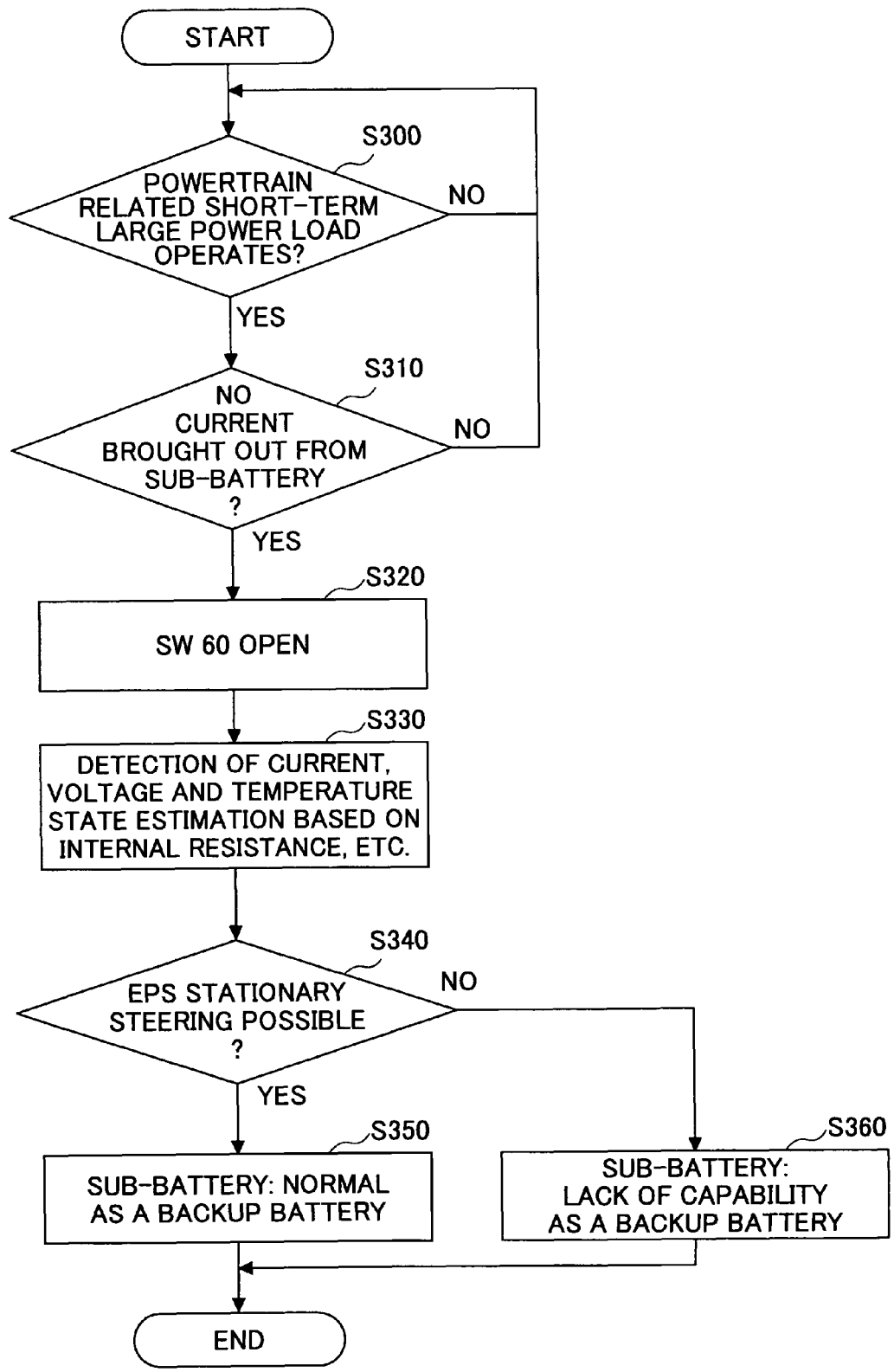

POWER SOURCE CONTROL DEVICE FOR POWER STEERING

TECHNICAL FIELD

The present invention relates to a power supply control device for an electric power steering device used for a power supply system comprising a first battery connected to the electric power steering device via a first power supply line and a second battery connected to the electric power steering device via a second power supply line.

BACKGROUND ART

JP2005-199908A discloses a battery state determination device for an electric power steering device comprising a first actuator driven by a main battery and a second actuator driven by a sub-battery, wherein if a lack of driving power occurs in steering wheels by means of the first actuator, the driving power of the first actuator is assisted by the driving power of the second actuator, characterized in that said battery state determination device is configured to determine an abnormality of the main battery if an amount of driving the second actuator exceeds a predetermined threshold.

However, in a power supply system using two or more than two different batteries, it is necessary to detect not only an abnormality of the main battery as the aforementioned prior art but also the state of the sub-battery. On the other hand, in order to detect the state of the sub-battery, it is necessary to form a power supply condition suited for the detection of the state.

DISCLOSURE OF INVENTION

It is an object of the present invention to provide a power supply control device which can form an appropriate power supply condition in detecting the state of a battery.

In order to achieve the aforementioned objects, according to the first aspect of the present invention, a power supply control device for an electric power steering device used for a power supply system comprises a first battery connected to the electric power steering device via a first power supply line and a second battery connected to the electric power steering device via a second power supply line, wherein when detecting a state of the second battery, said power supply control device restricts or disconnects power supply from the first battery to the electric power steering device while it permits power supply from the second battery to the electric power steering device, characterized in that said power supply control device prevents the detection of the state of the second battery if a vehicle speed is higher than a predetermined reference value.

According to the second aspect of the present invention, a power supply control device for an electric power steering device used for a power supply system comprises a first battery connected to the electric power steering device via a first power supply line and a second battery connected to the electric power steering device via a second power supply line, wherein when detecting a state of the second battery, said power supply control device restricts power supply from the first battery to the electric power steering device while it permits power supply from the second battery to the electric power steering device, characterized in that, when detecting the state of the second battery, said power supply control device restricts the power supply from the first battery to the electric power steering device within a range in which range a predetermined operation of the electric power steering device is enabled based on the restricted power supply.

The third aspect of the present invention is characterized in that said power supply control device has voltage selection means for applying the higher voltage, of a voltage supplied to the electric power steering device via the first power supply line and a voltage supplied to the electric power steering device via the second power supply line, to the electric power steering device, and in that when detecting the state of the second battery, said power supply control device changes the voltage supplied to the electric power steering device via the first power supply line to a lower limit value below which the predetermined operation of the electric power steering device is not enabled.

According to the fourth aspect of the present invention, in one of any aforementioned aspects of the present invention, said power supply control device prevents the detection of the state of the second battery if a steering angle or a steering torque of a steering wheel is lower than a predetermined reference value.

According to the fifth aspect of the present invention, in one of any aforementioned aspects of the present invention, wherein the second battery is connected to a separate load in addition to the electric power steering device, and when detecting the state of the second battery, said power supply control device restricts or disconnects power supply from the first battery to the electric power steering device and disconnects power supply from the second battery to the separate load while it permits power supply from the second battery to the electric power steering device, characterized in that said power supply control device prevents the detection of the state of the second battery when power more than a predetermined reference power is supplied from the second battery to the separate load.

According to the sixth aspect of the present invention, a power supply control device for an electric power steering device used for a power supply system comprising a first battery connected to the electric power steering device via a first power supply line and a second battery whose power supply voltage is lower than the first battery, said second battery being connected to the electric power steering device via a second power supply line, characterized in that when detecting a state of the second battery, said power supply control device restricts or disconnects power supply from the first battery to a predetermined load other than the electric power steering device, said predetermined load consuming large power for a short time period, while it permits power supply from the second battery to the predetermined load.

According to the present invention, a power supply control device which can form an appropriate power supply condition in detecting the state of a battery can be obtained.

BRIEF DESCRIPTION OF THE DRAWINGS

These and other objects, features, and advantages of the present invention will become more apparent from the following detailed description of preferred embodiments given with reference to the accompanying drawings, in which:

FIG. 5 is a system diagram of main components related to a power supply control device for an electric power steering device according to a third embodiment of the present invention; and FIG. 6 is a flowchart of a main process executed by a power supply control ECU 70 according to the third embodiment in cooperation with a state detection ECU 90.

EXPLANATION FOR REFERENCE NUMBER

Figure 1:
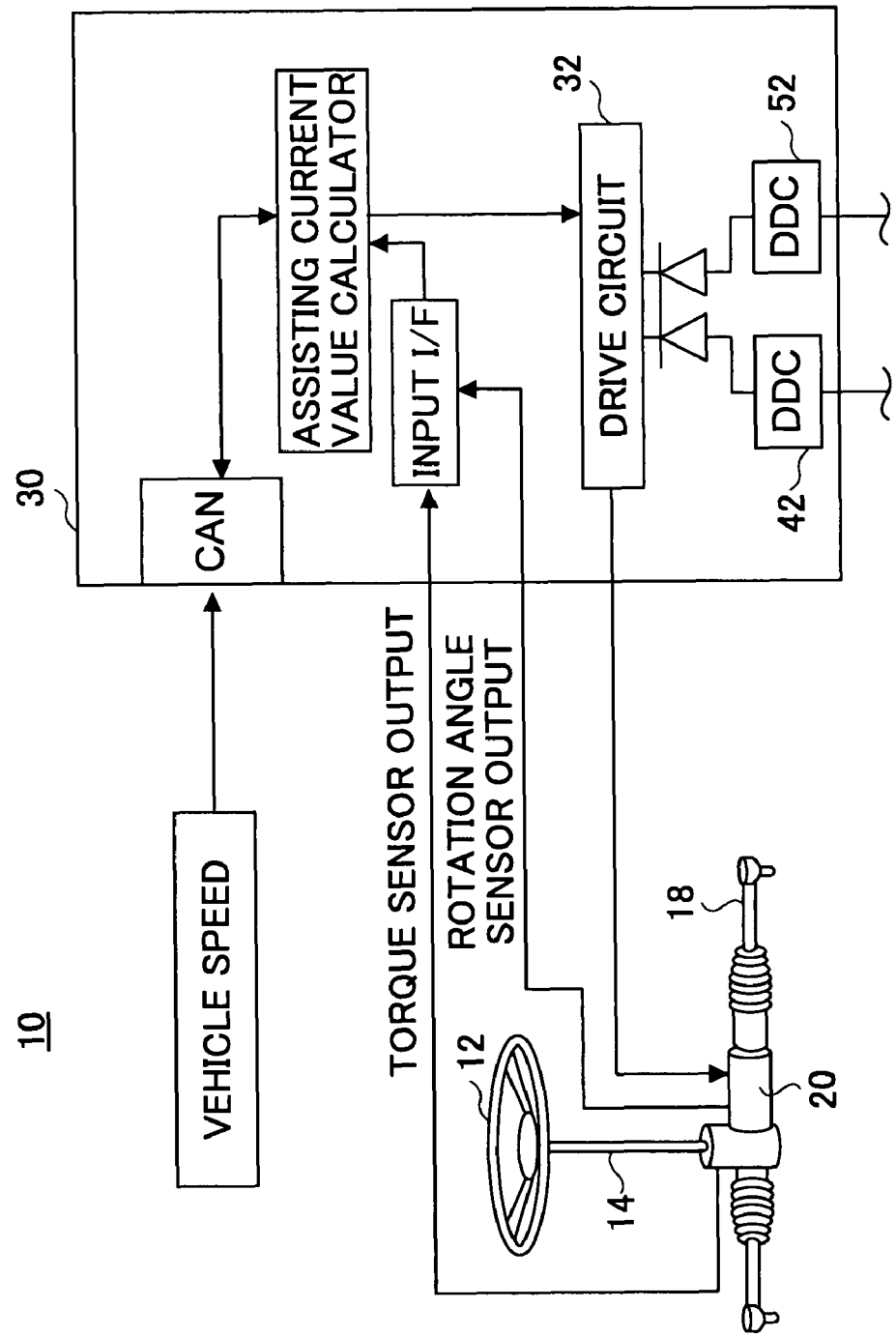
FIG. 1 is a schematic system diagram of an example of a electric power steering device 10 applicable to the present invention.

10 electric power steering device
30 EPS-ECU
40 main battery
42 first DDC
50 sub-battery
52 second DDC
60 switch
62 main DDC
70 power supply control ECU
80 loads
82 short-term large power loads
84 general loads
90 state detection ECU

BEST MODE FOR CARRYING OUT THE INVENTION

Hereafter, the preferred embodiments according to the present invention are explained with reference to the drawings.

First Embodiment

First, a basic configuration of an electric power steering (EPS) device is described generally with reference to FIG. 1.

FIG. 1 is a schematic system diagram of an example of an electric power steering device 10 applicable to the present invention. The electric power steering device 10 is configured to amplify a steering torque of a driver by means of an electric motor 20 (referred as to an assisting motor 20, hereafter) and transmit the amplified steering torque to wheels. In general outlines, the steering torque of a driver is generated when the driver operates to rotate a steering wheel, which causes a steering shaft 14 to rotate. This rotation of the steering shaft 14 is converted to a liner motion of a rack bar (not shown) via a rack and pinion. Due to this liner motion of the rack bar, steering of wheels is implemented via a liner motion of a tie rod 18.

The assisting motor 20 is disposed in a gear box, for example, and is engaged with the rack bar via a ball screw nut. The ball screw nut rotates by a rotation of a rotor, which causes (assists) the rack bar to move in its axial direction. Alternatively, the assisting motor 20 may be engaged with a steering shaft (a pinion shaft, etc.).

The assisting motor 20, which is a brushless DC motor, is connected to two lines of power supply (i.e., a main battery 40 and a sub-battery 50) via respective DC-DC converters 42 and 52 and a drive circuit 32 as described later. To the drive circuit 32 are connected output terminals of the DC-DC converters 42 and 52 via a diode OR which is configured to select the higher of the respective output voltages of the DC-DC converters 42 and 52. A current (i.e., an assisting current) supplied to the assisting motor 20 from the drive circuit 32 is controlled by an EPS-ECU 30.

The EPS-ECU 30 is comprised of a micro computer in which CPU, ROM, RAM, etc., are interconnected via bus lines. In ROM are stored programs, etc., executed by the CPU. To the EPS-ECU 30 are connected a vehicle speed sensor, etc., via an appropriate bus such as CAN (controller area network). The EPS-ECU 30 is configured to determine a value of the assisting current to be supplied to the assisting motor 20 based on the steering torque and the vehicle speed. Typically, the value of the assisting current is determined such that assisting power increases as the steering torque increases, and the assisting power in the case of higher vehicle speed becomes smaller than that in the case of lower vehicle speed. The value of the assisting current is feedback controlled by the EPS-ECU 30 based on output signals of a rotation angle sensor which detects the rotation angle of the assisting motor 20 (i.e., a rotor). The steering torque is calculated as a function of the difference between the angles detected by a pair of rotation angle sensors, one of which is provided on the steering shaft 14 and the other is provided on the pinion shaft (not shown). It is noted that the rotation angle sensor may be implemented using a resolver sensor or using a Hall element, such as a Hall IC sensor based on change in magnetic flux.

Figure 2:
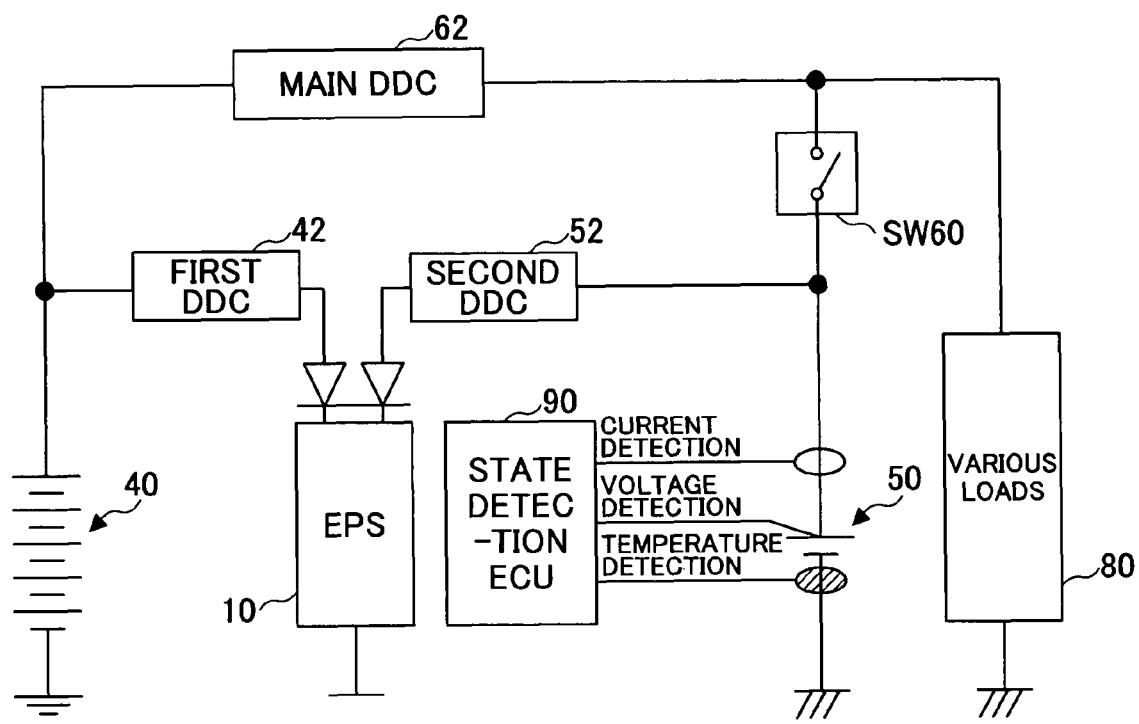
FIG. 2 is a system diagram of main components related to a power supply control device for an electric power steering device according to a first embodiment of the present invention.

Next, a power supply control device for the electric power steering device according to a first embodiment of the present invention is described in detail. FIG. 2 is a system diagram of main components related to the power supply control device for the electric power steering device according to a first embodiment of the present invention. The power supply control device is comprised mainly of an electric control unit 70 (referred to as a power supply control ECU 70, hereafter). The power supply control ECU 70, as is the case with an ordinary ECU, is comprised of a micro computer in which CPU, ROM, RAM, etc., are interconnected via bus lines.

The power supply control ECU 70 controls the status of power supply from a power supply for the electric power steering device to the electric power steering device by controlling operations (output voltages, etc.) of the respective DC-DC converter 42 and 52, a switch 60, etc., so as that detection of the state of the sub-battery 50 by a state detection ECU 90 is performed appropriately, as described later.

The power supply for the electric power steering device includes the main battery 40 and the sub-battery 50. The main battery 40 is a high-voltage power supply, and is comprised of a lithium ion battery whose rated voltage is about 288 V, for example. It is noted that a nickel hydrogen battery or capacitive load such as an electric double layer capacitor may be used as a main battery 40. The sub-battery 50 is comprised of a lead acid battery for auxiliary machinery whose rated voltage is about 14 V, for example.

The main battery 40 and the sub-battery 50 are connected to input and output terminals of a DC-DC converter 62 (referred to as a main DDC 62, hereafter) via the switch 60, respectively. The main DDC 62 may be an isolated DC-DC converter or a synchronous rectification type of non-isolated DC-DC converter. The switch 60 is switched on in an ordinary power supply status. The switch 60 may be a relay switch (i.e., a mechanical switch) or a semiconductor switch such as IGBT (Insulated Gate Bipolar Transistor), etc.

The main battery 40 is connected to various loads 80 via the main DDC 62, as shown in FIG. 2. The various loads 80 in this example are loads whose rated voltages are 14 V corresponding to the rated voltage 14 V of the sub-battery 50. The various loads 80 are auxiliary machinery (i.e., electronics installed in a vehicle) including various actuators for driving an engine (including a ECU which controls the engine, and the same is true hereafter), a transmission, a brake, an active stabilizer, an air suspension, etc., an audio device, an air-conditioning device, lamp components such as head lamps, fog lamps, cornering signal lamps, corner lamps, etc., a navigation system, meter devices, a defogger, various actuators for driving power windows and wipers, etc. Further, an alternating-current generator (i.e., an alternator, not shown) which generates power using the rotation of the engine may be connected to the main battery 40 via the main DDC 62. Further, in the case of a hybrid car in which both an electric motor for driving a wheel and an engine are used as drive sources, the electric motor for driving a wheel may be connected to the main battery 40 via the main DDC 62 and an inverter.

The sub-battery 50 is connected to various loads 80 via the switch 60. Thus, when the switch 60 is in its ON state, it is possible to supply power from the main battery 40 or the sub-battery 50 to the various loads 80. Further, when the switch 60 is in its OFF state, charging the sub-battery 50 from the main battery 40 (and vice versa), charging the sub-battery 50 and the main battery 40 using the power generated by the alternator, etc., may be possible. These power supply statuses are implemented by the power supply control ECU 70 by controlling the operation (output voltage) of the main DDC 62. In this example, the output voltage of the main DDC 62 is controlled to be higher than the terminal voltage of the sub-battery 50 so as that power supply to the various loads 80 may be implemented by using only the main battery 40 as a rule. For this reason, the sub-battery 50 is used as so-called backup power supply which functions only in the case of occurrence of a failure in the main battery 40 such as reduction of capacity, in the case of occurrence of a failure in the main DDC 62, in the case of the power demanded by the various loads 80 being high, etc.

The main battery 40 is connected to the electric power steering device 10 via the DC-DC converter 42 (referred to as a first DDC 42, hereafter), as described above. Further, the sub-battery 50 is connected to the electric power steering device 10 via the DC-DC converter 52 (referred to as a second DDC 52, hereafter). The first DDC 42 is connected to the main battery 40 in a parallel manner with respect to the main DDC 62 and the various loads 80, and similarly the second DDC 52 is connected to the sub-battery 50 in a parallel manner with respect to the main DDC 62 and the various loads 80. Further, the input side of the second DDC 52 is connected to the sub-battery 50 at the point between the sub-battery 50 and the switch 60.

The first DDC 42 drops the voltage input from the main battery 40 to a predetermined target output voltage V1 which corresponds to a rated voltage (14 V or 16 V, for example) of the electric power steering device 10 (assisting motor 20) and outputs the dropped voltage, under the control of the power supply control ECU 70. Similarly, the second DDC 52 boosts the voltage input from the sub-battery 50 to a predetermined target output voltage V2 and outputs the boosted voltage, under the control of the power supply control ECU 70. Here, in an ordinary power supply status, the predetermined target output voltage V1 is set higher than the predetermined target output voltage V2. Therefore, in the ordinary power supply status, the operation of the electric power steering device 10 is implemented by the power supplied from the main battery 40. For this reason, also for the electric power steering device 10, the sub-battery 50 is used as so-called backup power supply which functions only in the case of occurrence of a failure in the main battery 40 such as reduction of capacity and in the case of occurrence of a failure in the first DDC 42.

The power supply control ECU 70 is connected to various ECUs such as the EPS-ECU 30, the state detection ECU 90, etc., and various sensors such as the vehicle speed sensor, etc., via an appropriate bus such as CAN.

The state detection ECU 90 is implemented mainly by a CPU and includes a ROM in which programs or data for implementing a battery state detection function described later in detail are stored, RAM, I/O, etc. It is noted that the function of the state detection ECU 90 may be implemented by another ECU (typically, an EFI-ECU).

To the state detection ECU 90 are input a battery current, a battery voltage and a battery temperature. The battery current is detected with a current sensor (not shown). The current sensor is attached to the plus terminal of the sub-battery 50, for example. The current sensor detects the charge and discharge current amount at a predetermined sampling cycle and outputs the detection signal to the state detection ECU 90. For example, the current sensor may convert the change in magnetic flux density in a core, said change being generated due to the charge and discharge current, to a voltage using a Hall IC, for example, and supply the converted voltage to the state detection ECU 90. The battery voltage is detected with a voltage sensor (not shown). The voltage sensor is attached to the plus terminal of the sub-battery 50, for example. The voltage sensor detects the terminal voltage of the sub-battery 50 at a predetermined sampling cycle and outputs the detection signal to the state detection ECU 90. The battery temperature is detected with a battery temperature sensor (not shown). The battery temperature sensor includes a sensing portion comprised of a thermistor and is disposed on a side of an insulator of the sub-battery 50, for example. The battery temperature sensor detects the liquid temperature (battery temperature) of the sub-battery 50 at a predetermined sampling cycle and outputs the detection signal to the state detection ECU 90.

The state detection ECU 90 detects the state of the sub-battery 50 based on the battery current, the battery voltage and the battery temperature thus input in a predetermined cycle. The state of the sub-battery 50 detected by the state detection ECU 90 can be utilized to determine the output timing of advice urging a user to exchange the sub-battery 50, electrical power generation control of the alternator, etc. The state of the sub-battery 50 includes a state of charging (SOC) or degradation level of the sub-battery 50. In order to precisely determine the degradation level of the sub-battery 50, it is necessary to precisely detect an internal resistance of the sub-battery 50.

By the way, in order to precisely detect the internal resistance of the sub-battery 50, various data (the battery current, the battery voltage, etc.) obtained when the current brought out from the sub-battery 50 (i.e., the discharging current) is large are necessary. In other words, if various data are obtained when the short-term large power load, which consumes large power for a short term, such as the electric power steering device 10, the active stabilizer, etc., operates, it is possible to precisely detect the internal resistance of the sub-battery 50.

However, according to the configuration in which the sub-battery 50 functions as a backup battery as described above, in the normal status in which there is no abnormality in the line (including the main battery 40 itself) related to the main battery 40, even if the short-term large power load such as the electric power steering device 10, the active stabilizer, etc., operates, the current brought out from the sub-battery 50 (i.e., the discharging current) is zero or very small. For this reason, the state detection ECU 90 cannot precisely measure the state of the sub-battery 50, in particular the internal resistance of the sub-battery 50 in the ordinary power supply status.

To the contrary, according to the present embodiment, it is possible to use the line related to the sub-battery 50 instead of the line related to the main battery 40 only at the time of detection of the internal resistance of the sub-battery 50. In other words, it is possible to form the status, in which power is supplied to the electric power steering device 10 from the sub-battery 50 instead of the main battery 40, by switching off the switch 60 and changing the target output voltage V1 of the first DDC 42 to be lower than the target output voltage V2 of the second DDC 52.

However, conversely, in this state, power supply to the electric power steering device 10 from the main battery 40 is disabled. Thus, it is necessary to perform the detection of the state of the sub-battery 50 at an appropriate timing as a kind of insurance policy against the case where the sub-battery 50 has been proved to be abnormal as a result of the detection of the state of the sub-battery 50.

Against this backdrop, the present embodiment enables precisely measuring and detecting the state (internal resistance) of the sub-battery 50 at an appropriate timing, thanks to the features described later with reference to FIG. 3.

Figure 3:
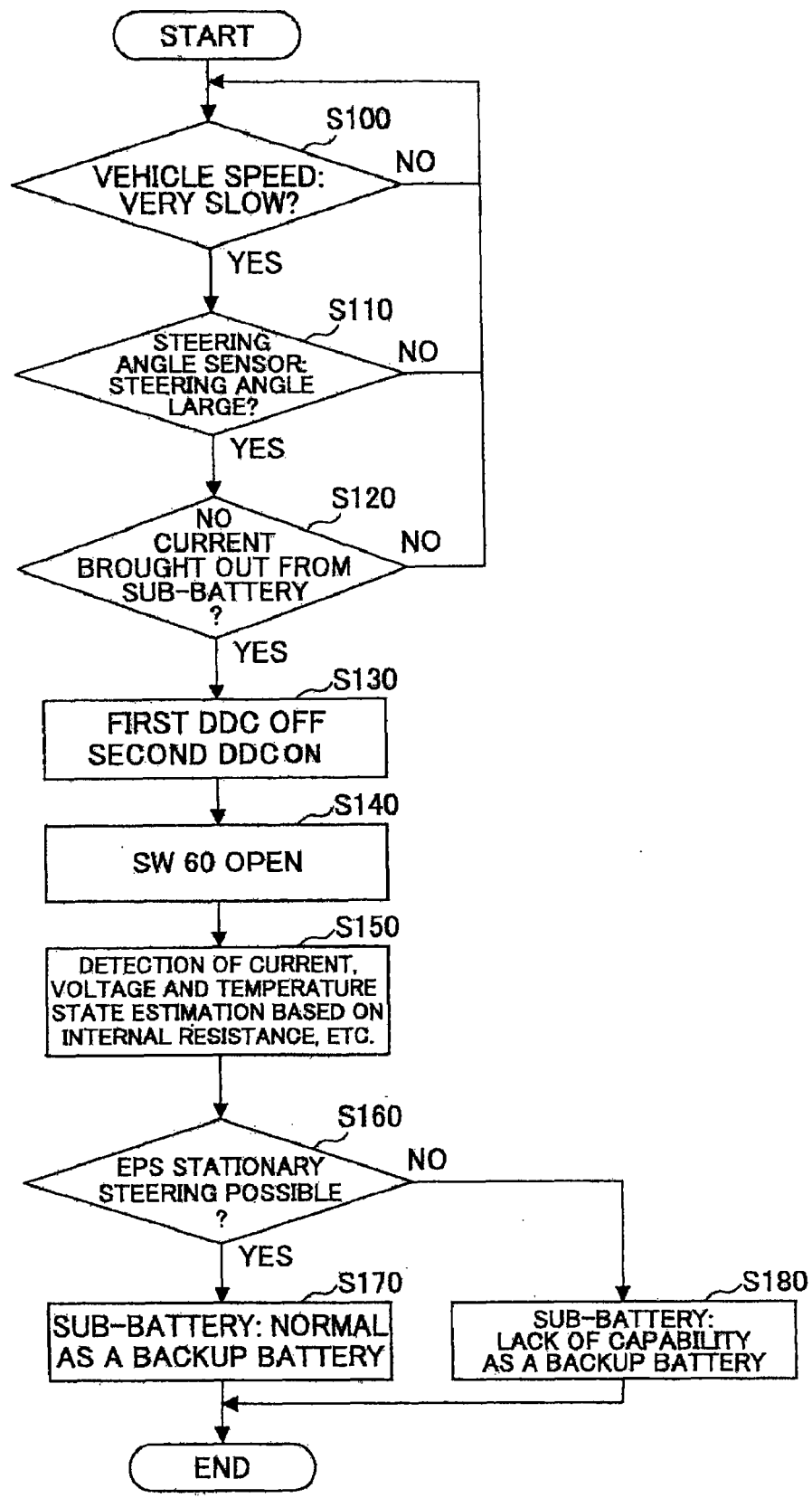
FIG. 3 is a flowchart of a main process executed by a power supply control ECU 70 according to the first embodiment in cooperation with a state detection ECU 90.

FIG. 3 is a flowchart of a main process executed by the power supply control ECU 70 according to the first embodiment in cooperation with the state detection ECU 90. The present process routine is performed in a predetermined cycle until the detection of the state of the sub-battery 50 is performed once in one trip from the time when an ignition switch is switched on to the time when the ignition switch is switched off. If the detection of the state of the sub-battery 50 is completed in a certain trip, the present process routine may be not executed thereafter in the trip. It is noted that the present process routine is executed assuming that there is no abnormality in the line (including the main battery 40 itself) related to the main battery 40. Any abnormality determination method may be used for determining the abnormality in the line related to the main battery 40. Further, the present process routine is executed in the ordinary power supply status in which the sub-battery 50 functions as a backup battery as described above.

In step 100, the power supply control ECU 70 determines whether the vehicle speed is lower than or equal to a predetermined reference value, based on the detection signal of the vehicle speed sensor. For example, the power supply control ECU 70 determines whether the vehicle speed is a very low speed (3 or 4 km/h, for example). If it is determined that the vehicle speed is not a very low speed, that is to say, it is determined that the vehicle speed is high, the power supply control ECU 70 determines that this cycle is not suited for detecting the state of the sub-battery 50, and then terminates the process routine of this cycle (i.e., the power supply control ECU 70 prevents the detection of the state of the sub-battery 50 in this cycle). Preferably, whether the vehicle speed is lower than a predetermined reference value is determined based on the criteria such that stopping the vehicle can be immediately implemented in a safe manner even if the electric power steering device 10 becomes inoperable. It is noted that it is still possible to steer the wheels without assistance of the electric power steering device 10 when the electric power steering device 10 becomes inoperable. If it is determined that the vehicle speed is lower than or equal to the predetermined reference value, the process goes to step 110.

In step 110, the power supply control ECU 70 determines whether the steering angle of the steering wheel 12 is greater than a predetermined reference steering angle, based on the steering angle information (i.e., output signal of the steering angle sensor). Preferably, the predetermined reference steering angle is determined in the light of whether the power supply (power supply to the assisting motor 20) required to implement the predetermined reference steering angle, that is to say, the current brought out from the sub-battery 50 is large enough to precisely measure the internal resistance of the sub-battery 50. In other words, the power supply control ECU 70 determines whether sufficiently large power is being supplied to the assisting motor 20 in response to the steering operation detected in this cycle. If it is determined that the steering angle of the steering wheel 12 is smaller than or equal to the predetermined reference steering angle, the power supply control ECU 70 determines that this cycle is not suited for detecting the state of the sub-battery 50, that is to say, the power supply control ECU 70 determines that the current brought out from the sub-battery 50 will not be sufficiently large even if power is supplied to the assisting motor 20 from the sub-battery 50, and then terminates the process routine of this cycle (i.e., the power supply control ECU 70 prevents the detection of the state of the sub-battery 50 in this cycle). On the other hand, if it is determined that the steering angle of the steering wheel 12 is greater than the predetermined reference steering angle, the process goes to step 120.

In step 120, the power supply control ECU 70 determines whether the current brought out from the sub-battery 50 is smaller than or equal to a predetermined reference value (which may be small value, even zero). The fact that the current brought out from the sub-battery 50 is greater than the predetermined reference value means that power is supplied to the various loads 80 from the sub-battery 50 because of specific situations, such as a situation in which the demanded power (consuming power) of the various loads is very great or a situation in which there is a reduction in the capacity of the sub-battery 50 to a level not representative of abnormality. Therefore, if it is determined that the current brought out from the sub-battery 50 is greater than the predetermined reference value, the power supply control ECU 70 determines that this cycle is not suited for detecting the state of the sub-battery 50, that is to say, the power supply control ECU 70 determines that there will be a problem in the operation of the various loads 80 which are now being supplied with power from the sub-battery 50 if power is supplied to the assisting motor 20 from the sub-battery 50, and then terminates the process routine of this cycle (i.e., the power supply control ECU 70 prevents the detection of the state of the sub-battery 50 in this cycle). It is noted that if the current brought out from the sub-battery 50 is greater than the predetermined reference value, the present process routine itself will be terminated in spite of the fact that it is possible to measure the internal resistance of the sub-battery 50 in this situation, because there is a possibility of abnormality in the line related to the main battery 40.

On the other hand, if it is determined that the current brought out from the sub-battery 50 is smaller than or equal to the predetermined reference value, the process goes to step 130. More specifically, if it is determined that the vehicle speed is lower than or equal to the predetermined reference value, the steering angle of the steering wheel 12 is greater than the predetermined reference steering angle, and the current brought out from the sub-battery 50 is smaller than or equal to the predetermined reference value, the power supply control ECU 70 determines that it is suitable to start to detect the state of the sub-battery 50 from this cycle, and then proceeds with the state detection process after step 130.

In step 130, the power supply control ECU 70 changes the target output voltage V1 of the first DDC 42, which is higher than the target output voltage V2 of the second DDC 52 in the ordinary power supply status as described above, in such a manner that the target output voltage V1 becomes sufficiently lower than the target output voltage V2 of the second DDC 52. For example, the power supply control ECU 70 changes the target output voltage V1 of the first DDC 42 to substantially zero. In other words, the power supply control ECU 70 substantially switches off the operation of the first DDC 42, and substantially switches on the operation of the second DDC 52. As a result of this process, the power supply line from the sub-battery 50 to the electric power steering device 10 via the second DDC 52 becomes active, while the power supply line from the main battery 40 to the electric power steering device 10 via the first DDC 42 becomes substantially disconnected.

In step 140, the power supply control ECU 70 switches the state of the switch 60 from ON state (close) to OFF state (open). As a result of this process, the power supply line from the sub-battery 50 to the various loads 80 becomes disconnected, and the power supply line from the main battery 40 to the electric power steering device 10 via the main DDC 62 and the second DDC 52 becomes disconnected. Hereafter, the power supply status formed as the result of the process of steps 130 and 140 is referred as to a "state detection purposes power supply status" in order to distinguish it from the ordinary power supply status. In this state detection purposes power supply status, in operation the electric power steering device 10 is supplied with power from the sub-battery 50. Therefore, sufficient current to measure the internal resistance of the sub-battery 50 is brought out from the sub-battery 50 when the electric power steering device 10 operates in response to the steering operation greater than the predetermined reference steering angle detected in step 110. When the process of step 140 is completed, the power supply control ECU 70 sends a notification as such to the state detection ECU 90. The notification triggers the state detection process from step 150 which are executed by the state detection ECU 90.

In step 150, the state detection ECU 90 measures (calculates) the internal resistance of the sub-battery 50 based on the various data (the battery current and the battery voltage) sampled when the large current is brought out from the sub-battery 50 in the state detection purposes power supply status. It is noted that any method of calculating the internal resistance may be used. For example, the relationship between the battery current and the battery voltage is measured at two points in time in the course of the battery current changing greatly due to the operation of the electric power steering device 10, and then the internal resistance is calculated based on the measured relationship. At this time, other factor such as the battery temperature or the polarization state of the sub-battery 50 may be taken into consideration.

In step 150, once the state detection ECU 90 acquires the necessary data, the state detection ECU 90 immediately sends a notification of such to the power supply control ECU 70. This notification triggers a return to the ordinary power supply status from the state detection purposes power supply status by the power supply control ECU 70. In other words, the power supply control ECU 70 switches on the switch 60 and returns the reduced target output voltage V1 of the first DDC 42 to the original target output voltage V1 which is higher than the target output voltage V2 of the second DDC 52. As a result of this process, the power supply line from the sub-battery 50 to the electric power steering device 10 via the second DDC 52 becomes substantially disconnected, while the power supply line from the main battery 40 to the electric power steering device 10 via the first DDC 42 becomes active. Thus, there is a possibility that once having acquired data required to measure the internal resistance of the sub-battery 50, current may be brought out from the main battery 40 in response to the steering operation detected this time in step 110 after the switching process has completed.

In step 160, the state detection ECU 90 determines whether the sub-battery 50 has a capability to supply power necessary to implement a predetermined operation of the electric power steering device 10 by itself, based on the internal resistance, the battery temperature, etc., of the sub-battery 50 measured in step 150. This determination may be implemented by comparing predetermined parameters such as the internal resistance, the battery temperature, etc., of the sub-battery 50 with predetermined reference values. The predetermined operation of the electric power steering device 10 may be a stationary steering (rest steering) operation which represents the hardest condition, as is illustrated in FIG. 3, or another steering operation which represents a somewhat less hard condition than the stationary steering but doesn't lead to a problem for safe driving. Further, the predetermined operation may be fixed or varied. If the determination result is yes, the state detection ECU 90 determines that the state of the sub-battery 50 is the intended normal state (step 170). On the other hand, if the determination result is no, the state detection ECU 90 determines that the state of the sub-battery 50 is not the intended normal state, that is to say, that the sub-battery 50 is lacking in the capability to function as a backup battery (step 180). In step 180, the state detection ECU 90 instructs the meter ECU to output an alarm or the like in the meter or the like, for example.

By the way, if the sub-battery 50 is proved to be lacking in the capability to function as a backup battery as a result of the process of step 160 by the state detection ECU 90, the assisting operation of the electric power steering device 10 in the state detection purposes power supply status will be malfunctioning or inoperable. However, in the present embodiment, since the state detection purposes power supply status is formed only when the vehicle speed is lower than or equal to the predetermined reference value as describe above, it is possible to implement safe and immediate stopping of the vehicle, even if the assisting operation of the electric power steering device 10 is malfunctioning or inoperable.

Further, in the present embodiment, the state detection purposes power supply status is formed only when the steering angle of the steering wheel 12 is greater than the predetermined reference steering angle. Thus, the state detection purposes power supply status is formed only at the time suited to measure the internal resistance of the sub-battery 50, that is to say, at the time when the brought out current becomes large. According to this arrangement, it becomes possible to improve the precision of the measured internal resistance of the sub-battery 50. It is noted that although the event in which the large current is consumed by the electric power steering device 10 is detected based on the magnitude of the steering angle in the aforementioned configuration, it is also possible to detect the event based on the magnitude of the steering torque or the steering rate (speed).

Further, if switching the power supply status from the normal power supply status to state detection purposes power supply status when the current brought out from the sub-battery 50 is large, the power supply capability for the various loads 80 is temporarily reduced greatly. Thus, it becomes possible to get the most out of the performance of the various loads 80 in operation. To the contrary, in the present invention, the state detection purposes power supply status is formed only when the current brought out from the sub-battery 50 is smaller than or equal to the predetermined reference value. Therefore, it is possible to minimize the reduction of the performance of the various loads 80 due to the disconnection of the power supply for the various loads 80 other than the electric power steering device 10.

Second Embodiment

Figure 4:
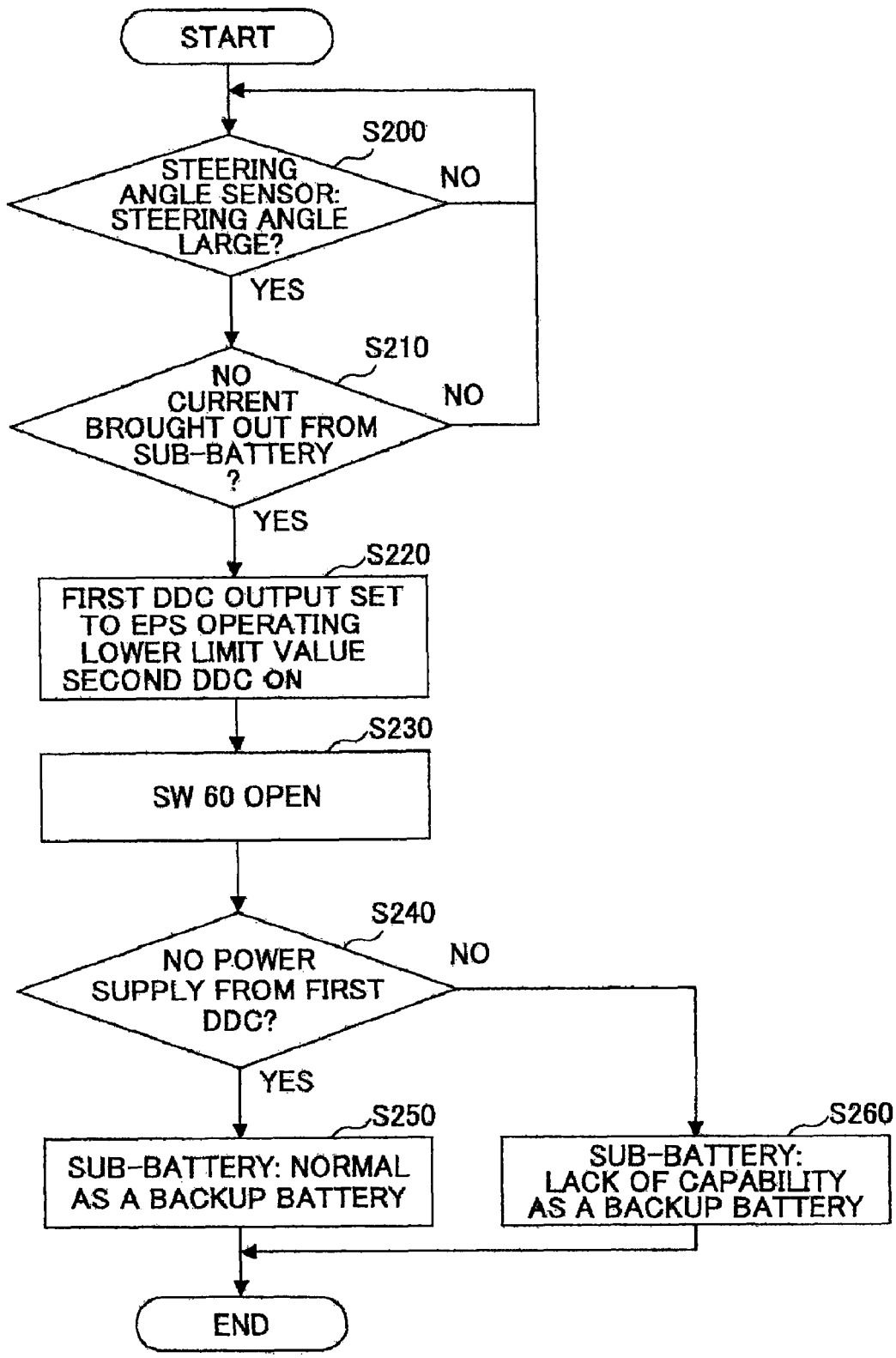
FIG. 4 is a flowchart of a main process executed by a power supply control ECU 70 according to a second embodiment.

FIG. 4 is a flowchart of a main process executed by a power supply control ECU 70 according to a second embodiment. Hereafter, to components which may be similar to the components described in the first embodiment are given the same reference numbers and the detailed description thereof is omitted.

In step 200, in the same terms of step 100, the power supply control ECU 70 determines whether the vehicle speed is lower than or equal to a predetermined reference value, based on the detection signal of the vehicle speed sensor. If it is determined that the vehicle speed is higher than the predetermined reference value, the power supply control ECU 70 determines that this cycle is not suited for detecting the state of the sub-battery 50, and then terminates the process routine of this cycle (i.e., the power supply control ECU 70 prevents the detection of the state of the sub-battery 50 in this cycle). On the other hand, if it is determined that the vehicle speed is lower than or equal to the predetermined reference value, the process goes to step 210.

In step 210, in the same terms of step 120, the power supply control ECU 70 determines whether the current brought out from the sub-battery 50 is smaller than or equal to a predetermined reference value. If it is determined that the brought out current is greater than the predetermined reference value, the power supply control ECU 70 determines that this cycle is not suited for detecting the state of the sub-battery 50, and then terminates the process routine of this cycle (i.e., the power supply control ECU 70 prevents the detection of the state of the sub-battery 50 in this cycle). On the other hand, if it is determined that the brought out current is smaller than or equal to the predetermined reference value, the process goes to step 220. More specifically, if it is determined that the steering angle of the steering wheel 12 is greater than the predetermined reference steering angle, and the current brought out from the sub-battery 50 is smaller than or equal to the predetermined reference value, the power supply control ECU 70 determines that it is suitable to start to detect the state of the sub-battery 50 from this cycle, and then proceeds with the state detection process after step 220.

In step 220, the power supply control ECU 70 reduces the target output voltage V1 of the first DDC 42, which is higher than the target output voltage V2 of the second DDC 52 in the ordinary power supply status as described above, to a predetermined value. This predetermined value corresponds to a lower limit value at which the electric power steering device 10 is operable, and is referred as to "EPS operating lower limit value" hereafter. The EPS operating lower limit value is sufficiently lower than the target output voltage V2 of the second DDC 52. For example, the EPS operating lower limit value may be about 9 V if the rated voltage of the electric power steering device 10 is 14 V. As a result of this process, the status is formed in which the sub-battery 50 is used on a priority basis with respect to the main battery 40. In other words, the power supply line from the main battery 40 to the electric power steering device 10 via the first DDC 42 is maintained as a backup, while the power supply line from the sub-battery 50 to the electric power steering device 10 via the second DDC 52 is used on a priority basis.

In step 230, the power supply control ECU 70 switches the state of the switch 60 from ON state to OFF state. As a result of this process, the power supply line from the sub-battery 50 to the various loads 80 becomes disconnected, and the power supply line from the main battery 40 to the electric power steering device 10 via the main DDC 62 and the second DDC 52 becomes disconnected. Hereafter, the power supply status formed as the result of the process of steps 220 and 230 is referred as to a "state detection purposes power supply status" in order to distinguish it from the ordinary power supply status.

In step 240, the power supply control ECU 70 monitors the output current of the first DDC 42 in the state detection purposes power supply status, and determines whether there is power supply from the first DDC 42 due to the steering operation (and thus the operation of the electric power steering device 10) detected in step 200.

Here, in the state detection purposes power supply status, in operation the electric power steering device 10 is supplied with power from the sub-battery 50 as a rule. However, if the sub-battery 50 is lacking in the capability to function as a backup battery due to degradation or the like, the output voltage of the second DDC 52 becomes lower than the EPS operating lower limit value. Thus, power is supplied to the electric power steering device 10 from the main battery 40 via the first DDC 42. Against the backdrop of this, if there is power supply from the first DDC 42 in the state detection purposes power supply status, the power supply control ECU 70 determines that the state of the sub-battery 50 is not the intended normal state, that is to say, that the sub-battery 50 is lacking in the capability to function as a backup battery (step 260). In step 260, the power supply control ECU 70 instructs the meter ECU to output an alarm or the like in the meter or the like, for example. On the other hand, if there is no power supply from the first DDC 42 in the state detection purposes power supply status, the power supply control ECU 70 determines that the state of the sub-battery 50 is the intended normal state (step 250).

It is noted that once the state detection purposes power supply status is formed as described above, the state detection purposes power supply status may be maintained for a fixed time (2 sec, for example), or may be maintained until the power demand disappears from the electric power steering device 10 due to the steering operation detected this time in step 200. The power supply control ECU 70 returns the power supply status to the ordinary power supply status from the state detection purposes power supply status at the time when the operation of the electric power steering device 10 ends. In other words, the power supply control ECU 70 switches on the switch 60 and returns the target output voltage V1 of the first DDC 42 to the ordinary value which is higher than the target output voltage V2 of the second DDC 52. As a result of this process, the power supply line from the sub-battery 50 to the electric power steering device 10 via the second DDC 52 becomes substantially disconnected, while the power supply line from the main battery 40 to the electric power steering device 10 via the first DDC 42 becomes active.

As is described above, according to the present embodiment, since the power supply line from the main battery 40 to the electric power steering device 10 via the first DDC 42 is not completely disconnected even in the state detection purposes power supply status, it is possible to prevent the assisting operation of the electric power steering device 10 from malfunctioning or being inoperable, even if the sub-battery 50 is proved to be lacking in the capability to function as a backup battery. In other words, according to the present embodiment, since the state detection purposes power supply status in which the large power is brought out from the sub-battery 50 in the assisting operation of the electric power steering device 10 is formed while reserving the power supply line from the main battery 40 for the assisting operation of the electric power steering device 10, it becomes possible to assure the assisting operation of the electric power steering device 10 and easily detect the state of the sub-battery 50. It is noted that in the present embodiment since the power supply line from the main battery 40 to the electric power steering device 10 via the first DDC 42 is not completely disconnected even in the state detection purposes power supply status, the determination as to the vehicle speed required in the first embodiment may be omitted.

Although in the present embodiment the state of the sub-battery 50 is detected by monitoring the output current of the first DDC 42 in the state detection purposes power supply status, it is also possible to detect the state of the sub-battery 50 by monitoring the output current of the second DDC 52 in the state detection purposes power supply status. In this case, if the output current of the second DDC 52 in the state detection purposes power supply status is larger than a predetermined reference value, the power supply control ECU 70 may determine that the state of the sub-battery 50 is the intended normal state. Alternatively, it is also possible for the power supply control ECU 70 to detect the state of the sub-battery 50 by monitoring the current brought out from the sub-battery 50 in the state detection purposes power supply status. In this case, if the current brought out from the sub-battery 50 in the state detection purposes power supply status is larger than a predetermined reference value, the power supply control ECU 70 may determine that the state of the sub-battery 50 is the intended normal state.

Third Embodiment

FIG. 5 is a system diagram of main components related to the power supply control device for the electric power steering device according to a third embodiment of the present invention. Hereafter, to components which may be similar to the components described in the first embodiment are given the same reference numbers and the detailed description thereof is omitted.

In the third embodiment, as shown in FIG. 5, the connection point of the input side of the second DDC 52 and the power supply manner for predetermined short-term large power loads among the various loads 80 differ from those in the first embodiment. Hereafter, the predetermined short-term large power loads among the various loads 80 are referred as to "short-term large power loads 82", and other loads are referred as to "general loads 84". The short-term large power loads 82 include the powertrain related short-term large power load (which contributes to increased comfort or the like), such as the active stabilizer, the air suspension, etc., and do not include the vehicle safety related short-term large power load, such as the brakes or the like. On the other hand, the general loads 84 include an audio device, air-conditioning device, headlamps, etc. It is noted that the power supply manner for the vehicle safety related short-term large power load, such as the brakes or the likes is the same as the power supply manner for the general loads 84.

With reference to FIG. 5, in the present embodiment, the input side of the second DDC 52 is connected to the power supply line from the main battery 40 via the main DDC 62 to the general loads not via the switch 60. The predetermined short-term large power loads 82 are directly connected to the sub-battery 50 not via the switch 60. On the other hand, the general loads 84 are connected to the sub-battery 50 via the switch 60, as is the case with the first embodiment.

In the ordinary power supply status, the switch 60 is in its on state, as is the case with the first embodiment, and the target output voltage V1 of the first DDC 42 is set higher than the target output voltage V2 of the second DDC 52.

FIG. 6 is a flowchart of a main process executed by the power supply control ECU 70 according to the third embodiment in cooperation with a state detection ECU 90.

In step 300, the power supply control ECU 70 determines whether any one of the predetermined short-term large power loads 82 operates. This determination may be implemented based on the information obtained by communicating with the ECUs which control the predetermined short-term large power loads. For example, if the operation instruction is output from an ECU when the operation start condition for a certain short-term large power load 82 is met, the power supply control ECU 70 immediately proceeds to the process of step 310 correspondingly.

In step 310, in the same terms of step 120, the power supply control ECU 70 determines whether the current brought out from the sub-battery 50 is smaller than or equal to a predetermined reference value. If it is determined that the brought out current is greater than the predetermined reference value, the power supply control ECU 70 determines that this cycle is not suited for detecting the state of the sub-battery 50, and then terminates the process routine of this cycle (i.e., the power supply control ECU 70 prevents the detection of the state of the sub-battery 50 in this cycle). On the other hand, if it is determined that the brought out current is smaller than or equal to the predetermined reference value, the process goes to step 320. More specifically, if it is determined that any one of the predetermined short-term large power loads 82 operates, and the current brought out from the sub-battery 50 is smaller than or equal to the predetermined reference value, the power supply control ECU 70 determines that it is suitable to start to detect the state of the sub-battery 50 from this cycle, and then proceeds with the state detection process after step 320.

In step 320, the power supply control ECU 70 switches the state of the switch 60 from ON state to OFF state. As a result of this process, the power supply line from the sub-battery 50 to the general loads 84 becomes disconnected, and the power supply line from the main battery 40 to the predetermined short-term large power loads 82 via the main DDC 62 becomes disconnected. Hereafter, the power supply status formed as the result of the process of step 320 is referred as to a "state detection purposes power supply status" in order to distinguish it from the ordinary power supply status. In this state detection purposes power supply status, in operation the predetermined short-term large power loads 82 are supplied with power from the sub-battery 50. Therefore, current sufficient enough to measure the internal resistance of the sub-battery 50 is brought out from the sub-battery 50 at the time of the operation of the certain predetermined short-term large power load 82 detected in the aforementioned step 300. When the process of step 320 is completed, the power supply control ECU 70 sends a notification as such to the state detection ECU 90. The notification triggers the state detection process steps from step 330 which are executed by the state detection ECU 90.

In step 330, as is the case with step 150, the state detection ECU 90 measures (calculates) the internal resistance of the sub-battery 50 based on the various data sampled when the large current is brought out from the sub-battery 50 in the state detection purposes power supply status. Once the state detection ECU 90 acquires the necessary data, the state detection ECU 90 immediately sends a notification as such to the power supply control ECU 70. This notification triggers a return to the ordinary power supply status from the state detection purposes power supply status by the power supply control ECU 70. In other words, the power supply control ECU 70 switches on the switch 60. As a result of this process, the power supply line from the sub-battery 50 to the predetermined short-term large power loads 82 becomes substantially disconnected, while the power supply line from the main battery 40 to the predetermined short-term large power loads 82 via the main DDC 62 becomes active. Thus, there is a possibility that once having acquired data required to measure the internal resistance of the sub-battery 50, current may be brought out from the main battery 40 due to the operation of the predetermined short-term large power loads 82 detected this time in step 300 after the switching process has completed.

In step 340, the state detection ECU 90 determines whether the sub-battery 50 has a capability to supply power necessary to implement a predetermined operation of the electric power steering device 10 by itself, based on the internal resistance, the battery temperature, etc., of the sub-battery 50 measured in step 330. The predetermined operation of the electric power steering device 10 may be a stationary steering (rest steering) operation which represents the hardest condition. If the determination result is yes, the state detection ECU 90 determines that the state of the sub-battery 50 is the intended normal state (step 350). On the other hand, if the determination result is no, the state detection ECU 90 determines that the state of the sub-battery 50 is not intended normal state, that is to say, that the sub-battery 50 is lacking in the capability to function as a backup battery (step 360). In step 360, the state detection ECU 90 instructs the meter ECU to output an alarm or the like in the meter or the like, for example.

In this way, according to the present embodiment, since the power supply line from the main battery 40 and the sub-battery 50 to the electric power steering device 10 is not disconnected even in the state detection purposes power supply status, it is possible to prevent the assisting operation of the electric power steering device 10 from malfunctioning or being inoperable, even if the sub-battery 50 is proved to be lacking in the capability to function as a backup battery. In other words, according to the present embodiment, since the state detection purposes power supply status in which the large power is brought out from the sub-battery 50 in the assisting operation of the electric power steering device 10 is formed without changing the power supply status for the electric power steering device 10, it becomes possible to assure the assisting operation of the electric power steering device 10 and precisely detect the state of the sub-battery 50. It is noted that in the present embodiment since the power supply line from the main battery 40 to the electric power steering device 10 via the first DDC 42 is not disconnected even in the state detection purposes power supply status and only the operations of the predetermined short-term large power loads 82 is limited, the determination as to the vehicle speed required in the first embodiment may be omitted.

It is noted that if the start timing of the operation of the predetermined short-term large power loads 82 is predictable, the state detection purposes power supply status may be formed in synchronization with the predicted start timing of the operation of the predetermined short-term large power loads 82. For example, if the predetermined short-term large power loads 82 include the air suspension, the state detection purposes power supply status may be formed when a switch for adjusting the height of the vehicle is made active after starting the engine. Further, if the predetermined short-term large power loads 82 include the active stabilizer, the state detection purposes power supply status may be formed when the vehicle is about to reach a tight curve (corner) at a high vehicle speed.

The present invention is disclosed with reference to the preferred embodiments. However, it should be understood that the present invention is not limited to the aforementioned embodiments, and variations and modifications may be made without departing from the scope of the present invention.

For example, although in the aforementioned embodiments the power supply control ECU 70 and the state detection ECU 90 are implemented by separate ECUs, the power supply control ECU 70 and the state detection ECU 90 may be implemented by a common ECU.

Further, although in the aforementioned embodiments, for the purpose of disclosing preferred embodiments, the state detection purposes power supply status is formed when all of the respective conditions are met, any condition(s) may be omitted, or another condition may be added.

Further, although in the aforementioned embodiments the sub-battery 50 is intended to be used as a backup, the sub-battery 50 may be used for other purposes. Thus, the respective characteristics of the sub-battery 50 and the main battery 40, such as power supply voltage, capacity, working condition, etc., should be determined appropriately based on their working manners.

INDUSTRIAL APPLICABILITY

As described above, the present invention can be applied to any type of vehicle as long as the power supply for the electric power steering device is implemented using two or more power supplies, and can be applied to hybrid electric vehicles starting with a fuel cell vehicle.

The present application is based on Japanese Priority Application No. 2005-350549, filed on Dec. 5, 2005, the entire contents of which are hereby incorporated by reference.

The invention claimed is:

1. A power supply control device for an electric power steering device used for a power supply system comprising:
   a first battery connected to the electric power steering device via a first power supply line;
   and a second battery connected to the electric power steering device via a second power supply line,
   wherein said power supply control device is configured such that when detecting a state of the second battery, said power supply control device restricts or disconnects power supply from the first battery to the electric power steering device while said power supply control device permits power supply from the second battery to the electric power steering device,
   wherein said power supply control device is configured to prevent the detection of the state of the second battery if a vehicle speed is higher than a predetermined reference value, and
   wherein said power supply control device is configured to prevent the detection of the state of the second battery if a steering angle or a steering torque of a steering wheel is lower than a predetermined reference value.

2. A power supply control device for an electric power steering device used for a power supply system comprising:
   a first battery connected to the electric power steering device via a first power supply line; and
   a second battery connected to the electric power steering device via a second power supply line,
   wherein said power supply control device is configured such that when detecting a state of the second battery, said power supply control device restricts power supply from the first battery to the electric power steering device while said power supply control device permits power supply from the second battery to the electric power steering device, wherein said power supply control device is configured such that when detecting the state of the second battery, said power supply control device restricts the power supply from the first battery to the electric power steering device within a range in which range a predetermined operation of the electric power steering device is enabled based on the restricted power supply, and wherein said power supply control device is configured to prevent the detection of the state of the second battery if a steering angle or a steering torque of a steering wheel is lower than a predetermined reference value.

3. The power supply control device as claimed in claim 2, wherein said power supply control device has voltage selection means for applying the higher voltage, of a voltage supplied to the electric power steering device via the first power supply line and a voltage supplied to the electric power steering device via the second power supply line, to the electric power steering device, and wherein when detecting the state of the second battery, said power supply control device is configured to change the voltage supplied to the electric power steering device via the first power supply line to a lower limit value below which the predetermined operation of the electric power steering device is not enabled.

4. The power supply control device as claimed in claim 1, wherein the second battery is connected to a separate load in addition to the electric power steering device, and when detecting the state of the second battery, said power supply control device restricts or disconnects power supply from the first battery to the electric power steering device and disconnects power supply from the second battery to the separate load while said power supply control device permits power supply from the second battery to the electric power steering device, wherein said power supply control device is configured to prevent the detection of the state of the second battery when power more than a predetermined reference power is supplied from the second battery to the separate load.

5. A power supply control device for an electric power steering device used for a power supply system comprising;
   a first battery connected to the electric power steering device via a first power supply line; and
   a second battery whose power supply voltage is lower than the first battery, said second battery being connected to the electric power steering device via a second power supply line, wherein said power supply control device is configured such that when detecting a state of the second battery, said power supply control device restricts or disconnects power supply from the first battery to a predetermined load other than the electric power steering device, said predetermined load consuming large power for a short time period, while said power supply control device permits power supply from the second battery to the predetermined load, and wherein said power supply control device is configured to predict a start of an operation of the predetermined load, and a state detection device is configured to perform the detection of the state of the second battery when the operation of the predetermined load is predicted to start.

6. The power supply control device as claimed in claim 1, wherein the first power supply line includes a first DC-DC converter;
   wherein the second power supply line includes a second DC-DC converter;
   wherein a third DC-DC converter is connected between the first battery and the second battery; and
   wherein the first DC-DC converter is connected in parallel with the third DC-DC converter and the second DC-DC converter is connected in parallel with the third DC-DC converter.

7. The power supply control device as claimed in claim 2, wherein the first power supply line includes a first DC-DC converter;
   wherein the second power supply line includes a second DC-DC converter;
   wherein a third DC-DC converter is connected between the first battery and the second battery; and
   wherein the first DC-DC converter is connected in parallel with the third DC-DC converter and the second DC-DC converter is connected in parallel with the third DC-DC converter.

8. The power supply control device as claimed in claim 5, wherein the first power supply line includes a first DC-DC converter;
   wherein the second power supply line includes a second DC-DC converter;
   wherein a third DC-DC converter is connected between the first battery and the second battery; and
   wherein the first DC-DC converter is connected in parallel with the third DC-DC converter and the second DC-DC converter is connected in parallel with the third DC-DC converter.

* * * * *